United States Patent
Shinners

(10) Patent No.: US 9,541,222 B2
(45) Date of Patent: Jan. 10, 2017

(54) DUCT FITTINGS

(75) Inventor: Michael John Shinners, Pacific, WA (US)

(73) Assignee: The Boeing Company, Chicago, IL (US)

( * ) Notice: Subject to any disclaimer, the term of this patent is extended or adjusted under 35 U.S.C. 154(b) by 1207 days.

(21) Appl. No.: 13/449,608

(22) Filed: Apr. 18, 2012

(65) Prior Publication Data

US 2013/0277962 A1    Oct. 24, 2013

(51) Int. Cl.
*F16L 3/12*       (2006.01)
*F16L 39/00*      (2006.01)
*B64D 37/00*      (2006.01)

(52) U.S. Cl.
CPC ............ *F16L 3/1222* (2013.01); *F16L 39/005* (2013.01); *B64D 37/005* (2013.01); *Y10T 29/49959* (2015.01)

(58) Field of Classification Search
CPC ........ F16L 3/1222; F16L 3/123; F16L 3/1233; F16L 39/005; B64D 37/005; B64D 39/06
See application file for complete search history.

(56) References Cited

U.S. PATENT DOCUMENTS

| | | | |
|---|---|---|---|
| 2,274,785 A | | 3/1942 | Gray |
| 3,485,516 A | * | 12/1969 | Kell et al. ........................ 285/14 |
| 3,819,209 A | | 6/1974 | Anderson et al. |
| 4,121,858 A | * | 10/1978 | Schulz ............................ 285/13 |
| 4,819,972 A | | 4/1989 | Champa et al. |
| 5,518,277 A | | 5/1996 | Sanders |
| 6,513,838 B2 | | 2/2003 | Poehler |
| 6,848,720 B2 | * | 2/2005 | Carns et al. .............. 285/123.15 |
| 8,308,200 B1 | * | 11/2012 | Barnes et al. ........... 285/123.15 |
| 2002/0153725 A1 | | 10/2002 | Myers |
| 2007/0145691 A1 | * | 6/2007 | Katsura ......................... 277/609 |
| 2007/0181204 A1 | | 8/2007 | Stout |
| 2009/0256352 A1 | * | 10/2009 | Petit ...................... F16L 39/005 285/123.15 |
| 2010/0018599 A1 | | 1/2010 | Ferrer et al. |
| 2012/0104172 A1 | * | 5/2012 | Haug et al. ............... 244/135 R |

FOREIGN PATENT DOCUMENTS

| | | |
|---|---|---|
| EP | 1 217 286 | 6/2002 |
| EP | 1731816 | 12/2006 |
| EP | 1731822 | 12/2006 |

OTHER PUBLICATIONS

Extended European Search Report dated Jun. 5, 2014 from Applicaton Serial No. 13163759.7.

* cited by examiner

*Primary Examiner* — James Hewitt
(74) *Attorney, Agent, or Firm* — Baldauff IP, LLC; Michael J. Baldauff, Jr.

(57) ABSTRACT

Duct fittings can be formed or assembled from two or more components including a collar and a clamp. The clamp and the collar can be assembled and/or mated together to form the duct fittings. The collar can have a first annular portion to which a first layer of a multilayered duct is attached or connected. The collar also can include a second annular portion that can include splines to which a second layer of the multilayered duct is attached. The splines can accommodate or form fluid passageways. The clamp can be located on top of the second layer and can include attachment mechanisms securing the clamp to a support surface.

10 Claims, 8 Drawing Sheets

DUCT FITTINGS

TECHNICAL FIELD

The present disclosure relates generally to duct fittings and, more particularly, to duct fittings for multilayer ducts.

BACKGROUND

Single-layered and multilayered ducts are sometimes used in a variety of applications. For example, multilayered ducts are sometimes used in aircraft or other vehicles to provide passageways for various fluids such as air, fuel, or the like. Providing duct fittings for mating two or more duct portions together, supporting the ducts, and/or for sealing a termination of the duct at a termination point can pose various problems.

In particular, because the multiple layers of a multilayered duct may need to be isolated from other atmospheres, providing a fitting that allows passage of fluids through the fitting often requires specifically-tailored duct fittings. Because the duct fittings may be attached to support surfaces, the duct fittings, in addition to having fluid passageways formed therein, can include support or attachment mechanisms. These support or attachment mechanisms may need to be located in a specific orientation with respect to a support surface. Meanwhile, the duct fittings may be welded to the ducts to seal the ducts and to provide the fluid passageways described herein.

If the duct is not welded or otherwise attached or connected to the duct fitting in an appropriate orientation, the duct fitting and/or the duct may be scrapped or require rework before the duct fitting can be secured to the support surface. Similarly, because the duct fitting may need to be precisely located with respect to the fluid passageways and/or attachment mechanisms, bulky and/or expensive tooling may be required or desired to allow precise placement of the duct fitting with respect to the ducts.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the embodiments disclosed herein, a duct fitting includes a collar and a clamp. The collar can include a first annular portion and a second annular portion. The first annular portion can include a support surface for engaging a first layer of a multilayered duct. The second annular portion can include a number of splines formed in the second annular portion. Voids can be formed between the splines. The splines can be configured to support a second layer of the multilayered duct. The clamp can include an attachment mechanism for connecting the clamp to a support structure and can be configured to cooperate with the collar to secure the second layer of the multilayered duct.

According to another aspect of the embodiments disclosed herein, a system can include a multilayered duct, a collar, and a clamp. The multilayered duct can include a first layer and a second layer. The collar can include a first annular portion and a second annular portion. The first annular portion can have a support surface configured to contact the first layer of the multilayered duct. The second annular portion can include a number of splines that can be configured to contact the second layer of the multilayered duct. The splines can be formed in the second annular portion with voids between the splines to provide fluid paths for fluids to pass through the duct fitting. The clamp can be disposed around the second layer of the multilayered duct and the collar. The clamp can include an attachment mechanism for connecting the clamp to a support structure.

According to yet another aspect of the embodiments disclosed herein, a method can include securing an inner layer of a collar to a first layer of a multilayered duct. The collar can include a first annular portion and a second annular portion. The first annular portion can have a support surface for contacting the first layer of the multilayered duct. The second annular portion can include a number of splines configured to contact the second layer of the multilayered duct. The splines can be formed in the second annular portion with voids between the splines to provide fluid paths for fluids to pass through the duct fitting. The method also can include locating an outer layer of the multilayered duct over the collar. The outer layer can be located on top of at least one of the splines. The method also can include securing the outer layer of the multilayered duct to the collar, locating a clamp over the collar and the outer layer of the multilayered duct, and securing the clamp to the outer layer of the multilayered duct. The clamp can include an attachment mechanism for connecting the clamp to a support structure.

According to yet another aspect of the embodiments disclosed herein, a method can include passing a fluid through a multilayered duct and passing the fluid through a duct fitting. The duct fitting can include a clamp and a collar having a plurality of voids. In some embodiments, the functionality of the plurality of voids can be provided by one or more spaced apart teeth or splines arranged on the collar. The splines can be circumferentially arranged on the collar. In some other embodiments, the duct fitting can include an inner portion and an outer portion, and the fluid can be passed through the inner portion while the outer portion can be configured to allow passage of fluids leaked from a first layer of the multilayer duct to a second layer of the multilayer duct. In some other embodiments, the fluid can be passed through the inner portion and the outer portion of the duct fitting.

The features, functions, and advantages discussed herein can be achieved independently in various embodiments of the concepts and technologies disclosed herein, or may be combined in yet other embodiments, further details of which can be seen with reference to the following description and drawings.

DETAILED DESCRIPTION

Figure 1:
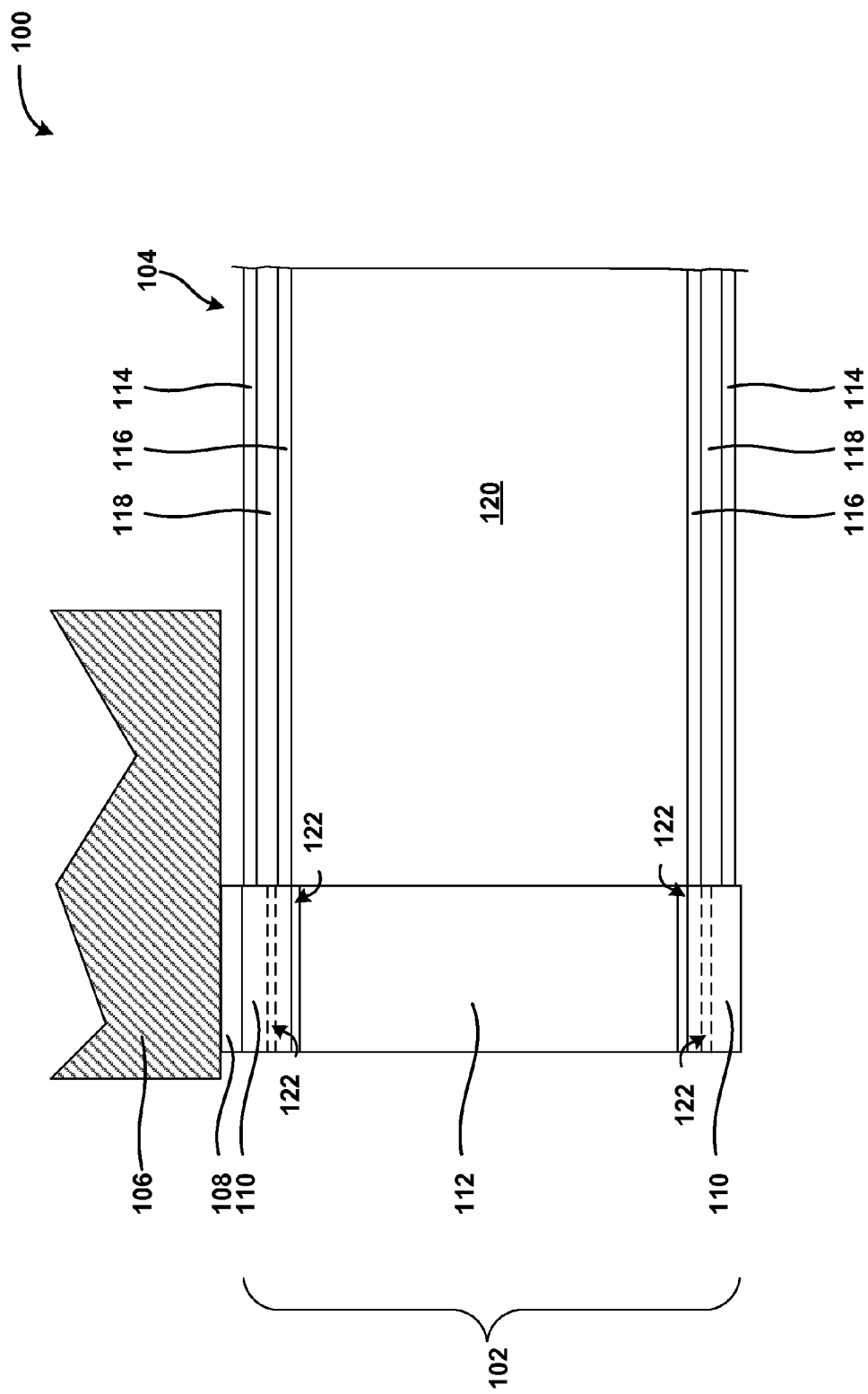
FIG. 1 is a line diagram illustrating an illustrative operating environment for the various embodiments disclosed herein.

The following detailed description is directed to duct fittings. According to various embodiments disclosed herein, the duct fittings can be used with single-layered and/or multilayered ducts such as air lines, fuel lines, insulated or vapor-vented ducts, combinations thereof, or the like. The duct fittings can be formed or assembled from two or more components. In particular, in some embodiments the duct fittings can include an annular inner component (a "collar") and an annular outer component (a "clamp"). The clamp and the collar can be assembled and/or mated together to form the duct fittings. In some embodiments, using two or more components to form the duct fittings can be used to simplify assembly of the duct fittings to ducts, can decrease an allowable margin for error, can be less expensive to machine than existing duct fittings, and/or can reduce the risk of scrapping or reworking duct fittings in the event of human error during the assembly of the duct fittings to ducts and/or other structures.

According to various embodiments, the collar can have a first annular portion to which a first layer of a multilayered duct is attached or connected. In some implementations of the duct fitting, the first annular portion and the first layer of the multilayered duct can be welded together using a fusion weld, though other connection and attachment mechanisms are contemplated. The collar further includes a second annular portion extending out from the first annular portion. The second annular portion can include splines formed therein to accommodate the flow of gas, liquid, fluids, or other materials. A second layer of the multilayered duct can be attached, connected, or otherwise located on top of the splines. In some embodiments, the second layer of the multilayered duct can be welded or otherwise attached or connected to the splines. Thus, the splines can provide a passageway for fluid that flows between the two layers of the multilayered duct.

The clamp can be located on top of the second layer of the multilayered duct. The clamp can include various attachment mechanisms for attaching the clamp, the collar, and/or the duct held thereby to a support structure such as a fuselage, a chassis, a wall, a ceiling, or another structure. In some embodiments, the functionality of the attachment mechanisms is provided by one or more devises that are formed on the clamp. The clamp can be located on top of the collar and the multiple layers of the multilayered duct, rotated into a proper orientation with respect to the support structure, and welded or otherwise locked into position.

It therefore can be appreciated that while existing duct fittings sometimes must be carefully clocked into a proper orientation with respect to a support structure during welding of the various layers of the multilayered duct thereto, embodiments of the duct fittings disclosed herein can be used to obviate such exacting demands. Thus, embodiments of the concepts and technologies disclosed herein can be used to simplify assembly of the duct fittings to multilayered ducts, reduce scrapping of the multilayered ducts and/or duct fittings, to reduce fabrication costs of the duct fittings, and/or to reduce tooling requirements for assembly of the duct fittings. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

Referring now to FIG. 1, an illustrative operating environment 100 for various embodiments of the concepts and technologies disclosed herein is illustrated. The operating environment 100 includes a duct fitting 102, which can be used to hold, connect, or attach a duct 104 to a support structure 106 via one or more attachment mechanisms 108. According to various embodiments, the duct fitting 102 can include a first component or portion ("clamp") 110 and a second component or portion (a "collar") 112. The clamp 110 can be located on top of the collar 112 and/or the duct 104. The clamp 110 can include one or more of the attachment mechanisms 108, which as mentioned above, can be used to attach or fasten the clamp 110 to the support structure. Various details of the clamp 110 and the collar 112, as well as other components of the duct fitting 102 are described in more detail below, particularly with reference to FIGS. 2-5C. As such, the illustrated and described embodiments should be understood as being illustrative of the concepts and technologies disclosed herein, and should not be construed as being limiting in any way.

In the illustrated embodiment, the duct 104 is illustrated as a double walled duct. It should be understood that the concepts and technologies disclosed herein can be used with single-layered ducts and/or ducts having in excess of two layers, if desired. In the illustrated embodiment, the duct 104 includes a first or outer layer ("outer layer") 114 and a second or inner layer ("inner layer") 116. It should be understood that in some embodiments of the duct 104 that exceed two layers, the outer layer 114 and/or the inner layer 116 may or may not correspond to outermost or innermost layers, respectively. As such, it should be understood that the illustrated embodiment is illustrative, and should not be construed as being limiting in any way.

In the illustrated embodiment, a fluid passageway 118 can be formed between the outer layer 114 and the inner layer 116. According to various embodiments, the fluid passageway 118 can be used to provide a pathway for ingress or egress of vapors, fluids, gases, liquids, or other materials. In other embodiments, the fluid passageway 118 can be used to provide an insulation or convection layer for heating, cooling, or insulating an inner fluid passageway 120 that can be enclosed and/or formed by the inner layer 116. It should be appreciated that one or more of the duct fitting 102, the duct 104, and/or the various components thereof can be annular and that the illustrated view shown in FIG. 1 therefore can correspond to a cutaway view of the various components and/or other structures shown in FIG. 1.

According to various implementations, the duct fitting 102 is assembled to the duct 104 by attaching the inner layer 116 to the collar 112. The inner layer 116 can be, but is not necessarily, attached to the collar 112 at a support surface 122 thereof. In various embodiments, the support surface 122 of the collar 112 includes a lip or support surface formed on the collar 112 (best seen with reference to FIG. 5A). According to some embodiments, the inner layer 116 of the duct 104 can be located on top of the support surface 122. In some other embodiments, as illustrated in FIG. 1 by way of dashed lines labeled 122, the inner layer 116 can be attached to or can be located within or under the support surface 122 and/or the remainder of the collar 112. As such, the illustrated embodiment should be understood to be illustrative of one contemplated embodiment and should not be construed as being limiting in any way.

Figure 2:
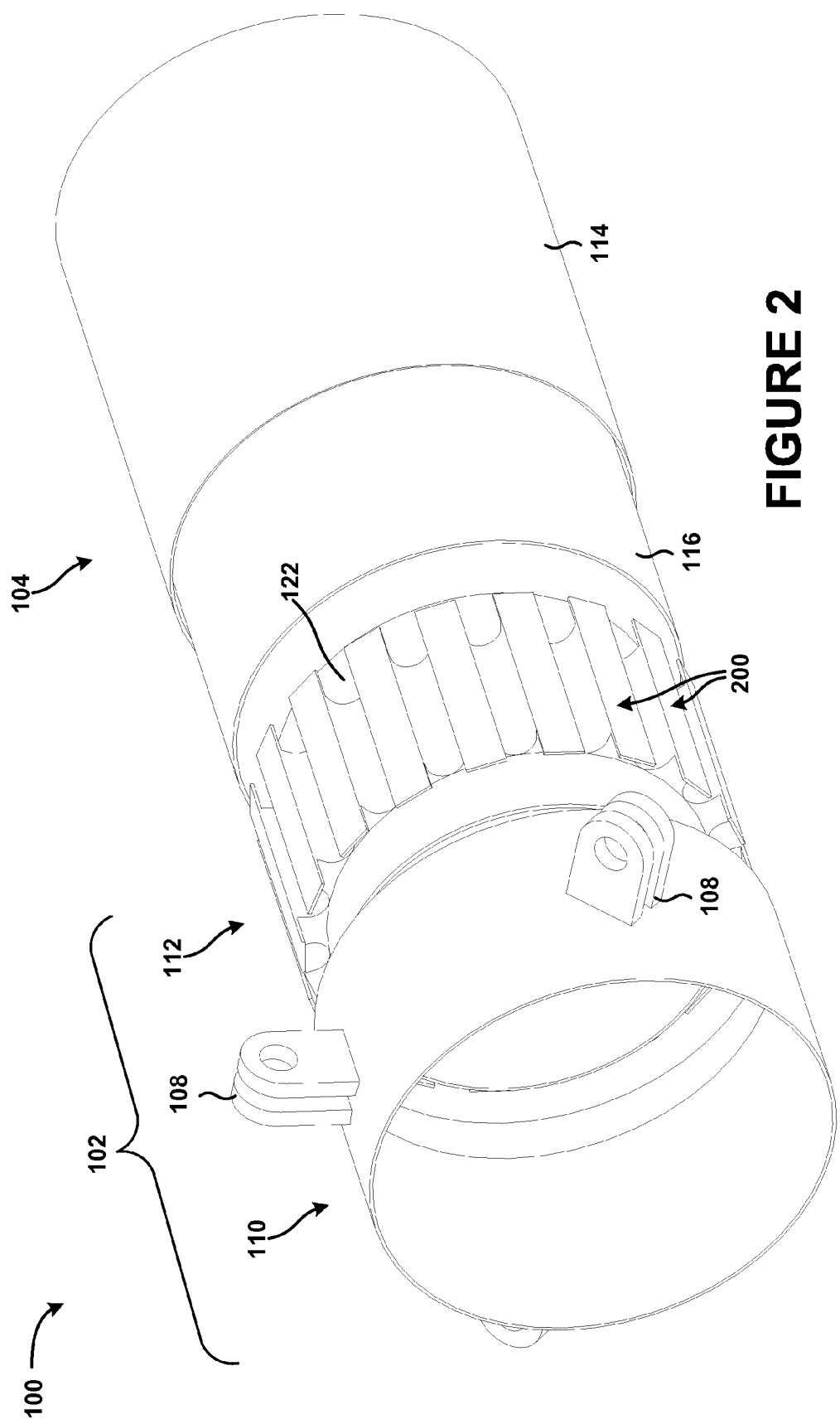
FIG. 2 is a line diagram showing a duct fitting, according to another illustrative embodiment.

The outer layer 114 of the duct 104 can be attached to or can be located on top of an outer surface of the collar 112 and/or under an inner surface of the clamp 110 (best visible in FIG. 2). The fluid passageway 118 can be created between the inner layer 116 and the outer layer 114. Although not visible in FIG. 1, the collar 112 can include one or more splines or spaced apart teeth that can form a part of the fluid passageway 118. As such, fluid passing through the fluid passageway 118 can pass through the splines or teeth of the collar 112, thereby enabling flow of fluids through and/or past the duct fitting 102. The splines or teeth of the collar are illustrated and described in more detail below with reference to FIGS. 2-5C.

The clamp 110 can be located over the duct 104 and locked in position with respect to the collar 112 and/or the duct 104. According to various embodiments, the clamp 110 can be locked in position using mechanical fasteners, chemical fasteners such as adhesives or the like, and/or via other connection mechanisms such as welding. In one contemplated embodiment, the clamp 110 is locked into position using a fusion welding process, though this is not necessarily the case. The clamp 110 can be attached to the support structure 106 via one or more of the attachment mechanisms 108, as mentioned above. According to one embodiment, the functionality of the attachment mechanisms 108 can be provided by one or more clevises or other structures (illustrated and described in FIGS. 2-4B). It should be understood that this embodiment is illustrative, and should not be construed as being limiting in any way.

The operating environment 100 is illustrated in FIG. 1 as including one duct fitting 102, one duct 104, one support structure 106, and one attachment mechanism 108. It should be understood, however, that some embodiments of the operating environment 100 include multiple duct fittings 102, multiple ducts 104, multiple support structures 106, and/or multiple attachment mechanisms 108. Furthermore, some embodiments of the duct 104 include more than two or less than two layers, as explained above. As such, the illustrated embodiments should be understood as being illustrative of one contemplated embodiment and should not be construed as being limiting in any way.

Turning now to FIG. 2, additional aspects of the duct fitting 102 and the implementation thereof in the operating environment 100 are described in detail. In particular, FIG. 2 is an exploded assembly drawing showing assembly of the duct fitting 102 and the duct 104, according to an illustrative embodiment. Because various structures and the scales and locations thereof can be varied for particular implementations of the duct fitting 102, the illustrated embodiment should be understood as being illustrative of one embodiment and should not be construed as being limiting in any way.

As described above with regard to FIG. 1, some embodiments of the duct 104 can include an outer layer 114 and an inner layer 116. As explained above in detail, while the duct 104 is illustrated in FIG. 2 with two layers, the duct 104 can include a single layer or more than two layers, if desired. Furthermore, while the fluid passageway 118 described and illustrated in FIG. 1 is visible in FIG. 2, the fluid passageway 118 is not labeled in FIG. 2 because of the orientation of the various components illustrated in FIG. 2.

As shown in FIG. 2 and described above, the illustrated clamp 110 can include any number of attachment mechanisms 108. In the embodiment shown in FIG. 2, the functionality of the attachment mechanisms 108 is provided by one or more clevises. Because other structures or devices can be used to provide the functionality associated with the attachment mechanisms 108, it should be understood that this embodiment is illustrative, and should not be construed as being limiting in any way. Furthermore, because any number of attachment mechanisms 108 can be included, and because the relative locations and scales of the attachment mechanisms 108 can be varied, the illustrated embodiment should be understood as being illustrative of one embodiment.

During assembly of the duct fitting 102 to the duct 104, as mentioned above, the inner layer 116 can be attached or connected to the support surface 122 of the collar 112. The inner layer 116 can be attached to an inside of the support surface 122 or to a top of the support surface 122. In various embodiments, the inner layer 116 is attached to the support surface 122 using a welding operation such as fusion welding, though other attachment mechanisms are contemplated and are possible.

It can be appreciated from FIG. 2 that by providing the duct fitting 102 as two components that are freely moveable with respect to one another, that the inner layer 116 can be attached to the collar 112 without regard to the orientation of the inner layer 116 relative to the attachment mechanisms 108 of the clamp 110. Thus, one assembling the duct 104 to the duct fitting 102 can do so without having to ensure that the attachment mechanisms 108 are oriented in the correct position with respect to the duct 104 and/or a support structure (shown in FIG. 1). As such, embodiments of the concepts and technologies disclosed herein can be used to simplify assembly of the duct fitting 102 to the duct 104, though this is not necessarily the case.

With the inner layer 116 attached or connected to the collar 112, the outer layer 114 can be moved into position on top of the collar 112. In particular, in some embodiments, the outer layer 114 is moved to a position on top of one or more splines or circumferentially spaced-apart teeth ("splines") 200 formed in the collar 112. As will be described in more detail below with reference to FIGS. 3-5C, the splines 200 can be used to provide a fluid flow path through the collar 112. More particularly, voids (visible in FIG. 3) of the splines 200 can be used to provide one or more fluid passageways 118, or a portion or portions thereof.

The clamp 110 can be placed on top of the outer layer 114 of the duct 104, if desired. As such, the clamp 110 can be used to hold or secure the outer layer 114 in position with respect to the collar 112 and/or the duct 104. Again, because the collar 112 and the clamp 110 can be provided as two independent components, locating the clamp 110 with respect to the collar 112 can entail merely locating the clamp 110 on top of the collar 112 and the outer layer 114 and rotating the clamp 110 into an orientation for engaging the support structure 106 via the attachment mechanisms 108. Thus, the components shown in FIG. 2 can be oriented in a stacked or nested relation to one another such that the inner fluid passageway 120 (shown in FIG. 1) is surrounded by an inner portion of the collar 112.

More particularly, in one contemplated embodiment, the inner portion of the collar 112 can engage the inner layer 116 of the duct 104. The duct 104 can be surrounded by the fluid passageway 118 (shown in FIG. 1). The fluid passageway 118, meanwhile, can be located between the inner layer 116 and the outer layer 114 of the duct 104. The outer layer 114 can be surrounded, at least partially, by the clamp 110. It should be understood that this embodiment is illustrative, and should not be construed as being limiting in any way.

Figure 3:
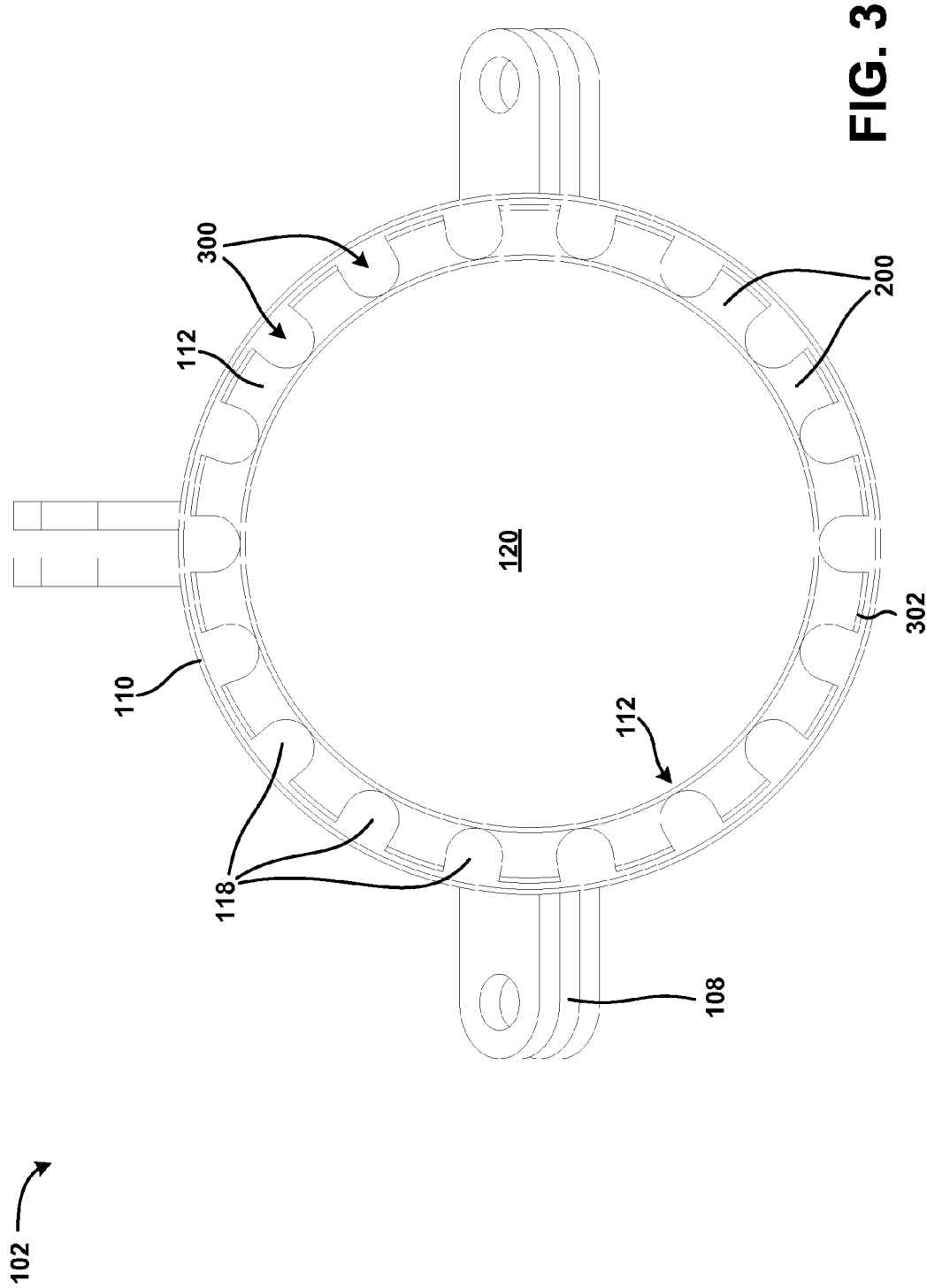
FIG. 3 is a line diagram showing additional aspects of the duct fitting, according to an illustrative embodiment.

Turning now to FIG. 3, additional aspects of the duct fitting 102 are described in detail. In particular, FIG. 3 is a line drawing showing assembly of the collar 112 and the clamp 110 to form the duct fitting 102. It should be noted that the duct 104 is not illustrated in FIG. 3 to avoid obscuring boundaries of the collar 112 and the clamp 110. Because various structures of the duct fitting 102 and/or the scales and locations thereof can be varied for particular implementations of the duct fitting 102, the illustrated embodiment should be understood as being illustrative of one embodiment and should not be construed as being limiting in any way.

In FIG. 3, the fluid passageway 118 is shown as being provided by multiple voids 300 formed by the splines 200. It should be appreciated that if the outer layer 114 (shown in FIG. 2) engages an outer surface 302 of the collar 112, that the multiple voids 300 can be isolated from one another by the splines 200 and the outer layer 114. As such, the voids 300 can provide a number of fluid passageways 118 that may or may not be isolated from one another and/or may or may not be in fluidic communication with one another. One illustrative embodiment of the collar 112 is described in more detail below with reference to FIGS. 5A-5C.

It can be appreciated from the description of FIGS. 1-2 above that the outer layer 114 of the duct 104 can be located between the collar 112 and the clamp 110. Thus, the clamp 110 and the collar 112 can cooperate to hold the outer layer 114 in position on top of the collar 112, in some embodiments. Additionally, though not shown in FIG. 3, the clamp 110 can include a tensioner or other mechanism for adjusting the diameter of the clamp 110, if desired. In other embodiments, the clamp 110 is dimensioned such that the clamp 110 engages the outer layer 114. A weld or other attachment or connection mechanism can be used to hold the clamp 110 and/or the outer layer 114 in position and/or orientation with respect to one another and/or a support structure 106. It should be understood that these embodiments are illustrative, and should not be construed as being limiting in any way.

Figure 4A:
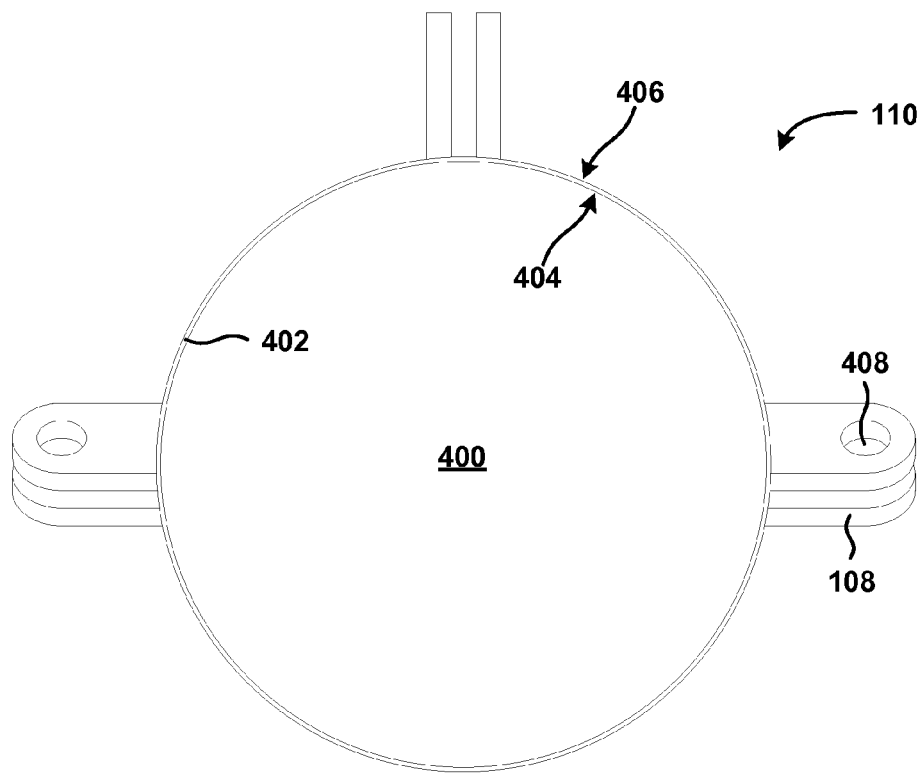
FIGS. 4A-4B are line drawings showing additional aspects of the duct fitting clamp, according to an illustrative embodiment.
Figure 4B:
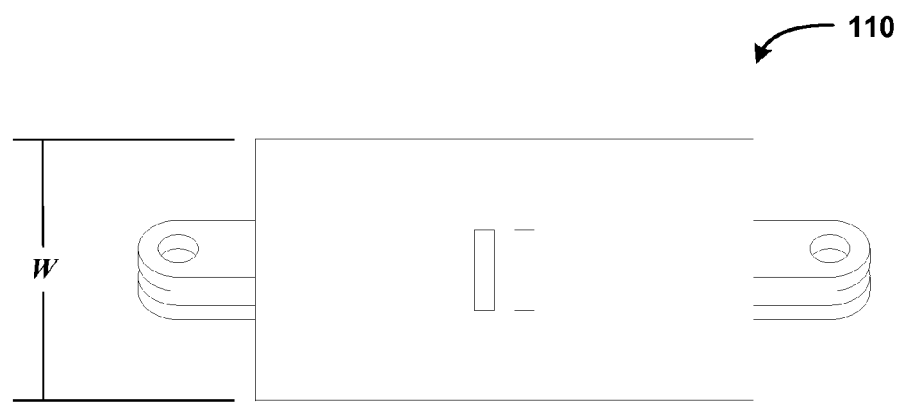

Turning now to FIGS. 4A-4B, additional aspects of the duct fitting 102 are described in detail. In particular, FIG. 4A is a line drawing showing a front view of the clamp 110 and FIG. 4B is a line drawing showing a top view of the clamp 110, according to an illustrative embodiment. As shown in FIG. 4A, the clamp 110 can include an inner void 400. The inner void 400 can be configured to accommodate the duct 104 and the collar 112. In one contemplated embodiment, the clamp 110 is dimensioned such that a diameter of the inner void 400 measures about 6.0200 inches. It should be understood that this embodiment is illustrative, and should not be construed as being limiting in any way.

According to various embodiments, the inner void 400 is formed by a body 402 of the clamp 110. In the illustrated embodiment, the body 402 is formed as an annular ring that has inner surface 404 and an outer surface 406. As can be appreciated from the description above, the inner surface 404 can be configured to engage the outer layer 114 of the duct 104 (shown in FIG. 2). Thus, in some embodiments in which the diameter of the inner void 400 measures about 6.0200 inches, the outer layer 114 of the duct 104 can be sized approximately equal to, or slightly less than, 6.0200 inches. Because the diameter of the inner void 400 can be varied based upon design or other considerations, it should be understood that this embodiment is illustrative, and should not be construed as being limiting in any way.

According to one contemplated embodiment, the width w of the clamp 110 (best visible in FIG. 4B) can be approximately 3.250 inches. The width w and/or other dimensions of the clamp 110 can be varied, almost without limitation, based upon design needs or other considerations. Additionally, in the illustrated embodiment the attachment mechanisms 108 are illustrated as clevises that include a through hole 408 for engaging other attachment mechanisms such as a structure formed on the support structure 106 (visible in FIG. 1). Furthermore, it should be understood that the attachment mechanisms 108 can be rotated, scaled, moved, or located almost anywhere on the surface of the clamp 110. Because the use of clevises as the attachment mechanisms 108 and the various dimensions described herein are examples included only in some contemplated embodiments, it should be understood that the various described and illustrated embodiments are illustrative, and should not be construed as being limiting in any way.

Figure 5A:
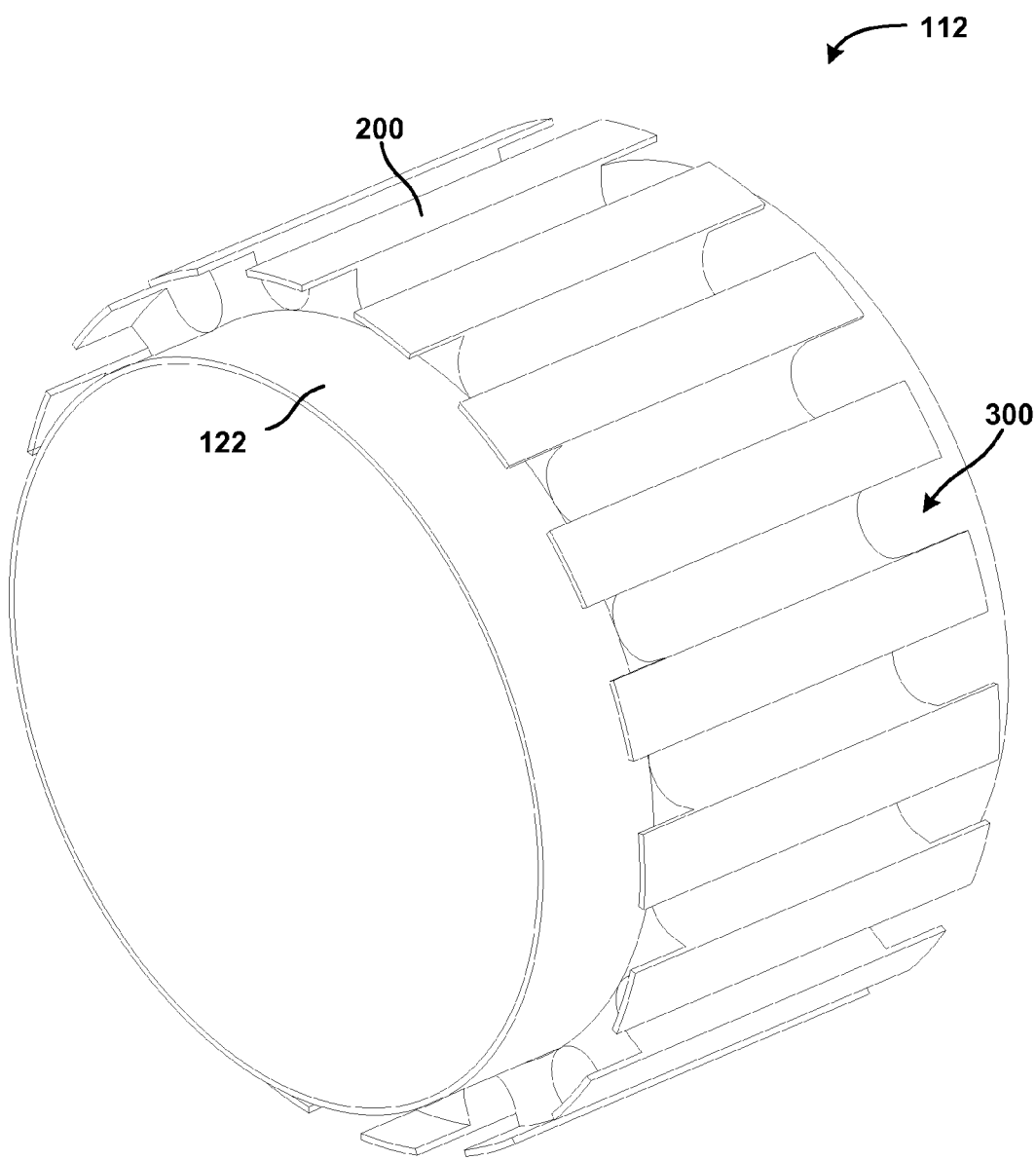
FIGS. 5A-5C are line drawings showing additional aspects of the duct fitting collar, according to an illustrative embodiment.
Figure 5B:
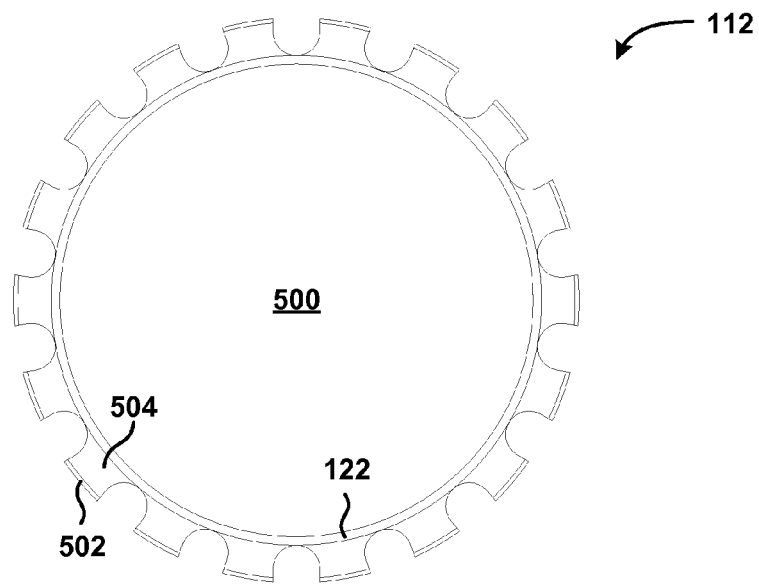
Figure 5C:
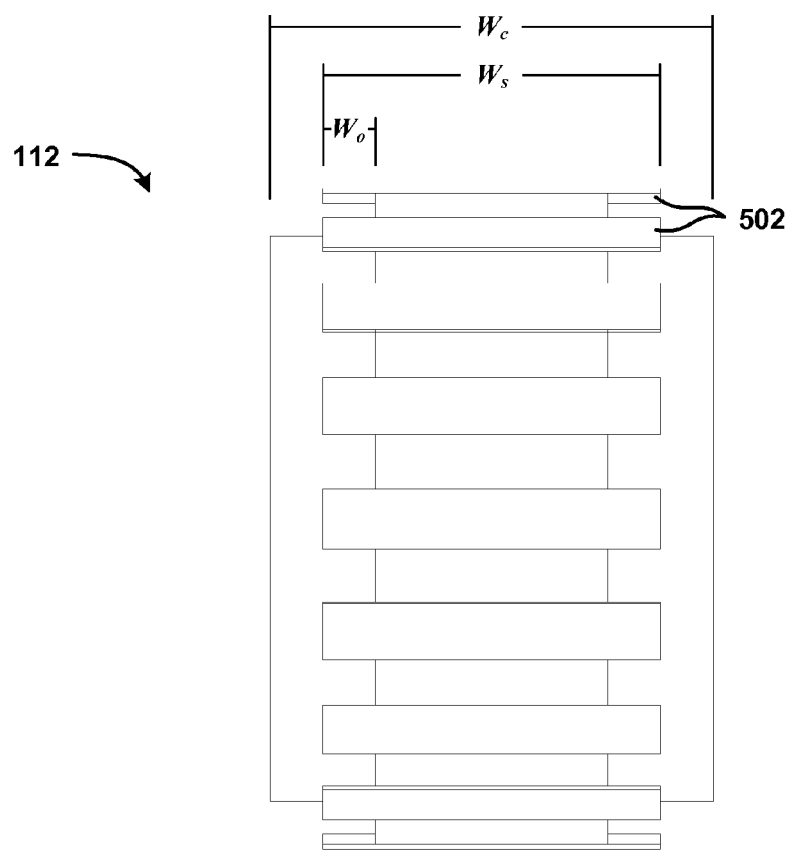

Turning now to FIGS. 5A-5C, additional aspects of the duct fitting 102 are described in detail. In particular, FIGS. 5A-5C are line drawings showing various views of the collar 112, according to an illustrative embodiment thereof. Because the various structures of the collar 112, the relative scales and/or locations thereof, and/or other aspects of the collar 112 can be varied based upon design, aesthetic, manufacturing, and/or assembly considerations, it should be understood that the embodiment of the collar 112 shown in FIGS. 5A-5C is illustrative, and should not be construed as being limiting in any way.

The collar 112 can include an inner collar void 500 (best visible in FIG. 5B). The inner collar void 500 can be configured to provide, in cooperation with the duct 104, the inner fluid passageway 120 discussed above with reference to FIG. 1. In one contemplated embodiment of the collar 112, the collar 112 is dimensioned such that the inner collar void 500 can accommodate an outer diameter of the inner layer 116 of the duct 104, though this is not necessarily the case. As such, in one embodiment wherein the inner layer 116 of the duct 104 has a diameter of about 5.000 inches, a diameter of the inner collar void 500 can measure about 5.0200 inches. Because the diameters of the duct 104 and/or the collar 112 can be varied to accommodate various implementations, it should be understood that this embodiment is illustrative, and should not be construed as being limiting in any way.

Additionally, the support surface 122 of the collar 112 is dimensioned, in one contemplated embodiment, with a thickness of about 0.090 inches. It should be understood that this embodiment is illustrative, and should not be construed as being limiting in any way. The splines 200 described above with reference to FIGS. 2-3 are also shown in FIGS. 5A-5C and are now described in more detail.

The splines 200 can be obtained, in various embodiments, by machining or otherwise processing round stock or other suitable raw material. In the illustrated embodiment, a portion of round stock having an outer diameter of about 6.000 inches is obtained or fabricated. A one-half inch ball nose bit can be used to form the splines 200 in the collar 112. As such, the voids 300 can have a radius of about one quarter of an inch. In the illustrated embodiment, the voids 300 are about one half inch deep and can provide the fluid passageway 118 described above in the various embodiments. Because the splines 200 can be formed in other manners and with other dimensions, the described embodiment should be understood as being illustrative and should not be construed as being limiting in any way.

With reference to FIG. 5C, additional dimensions of the illustrated embodiment are provided. In the illustrated embodiment, the collar 112 has an overall width $w_c$ of about 4.000 inches. One or more of the splines 200 can have a spline width $w_s$ of about 3.050 inches. Furthermore, the splines 200 can include an overhang portion 502 (best visible in FIG. 5C) that can hang over a body 504 of the splines 200 by about 0.525 inches on each side (this overhang dimension is illustrated in FIG. 5C as $w_o$). In some embodiments, a chamfer, fillet, or other surface can be formed between the splines 200 and support surface 122, if desired, though such a surface is not illustrated in the FIGURES. Because all of the dimensions set forth above are illustrative of only one contemplated embodiment, it should be understood that this embodiment is illustrative, and should not be construed as being limiting in any way.

Figure 6:
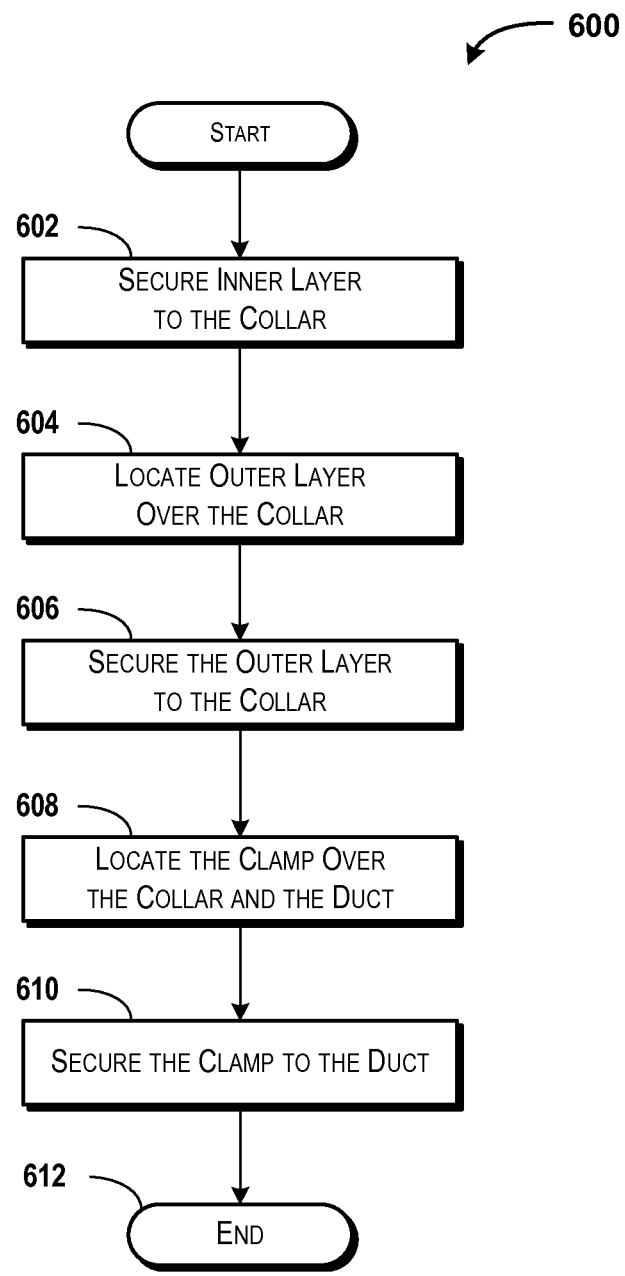
FIG. 6 is a flow diagram showing aspects of a method for assembling a duct fitting, according to one illustrative embodiment.

Turning now to FIG. 6, aspects of a method 600 for assembling a duct fitting 102 to a multilayered duct 104 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the method 600 can be ended at any time and need not be performed in its respective entireties.

The method 600 begins at operation 602, wherein an inner layer 116 of the duct 104 is secured to the collar 112. According to various embodiments, the inner layer 116 can be located within the inner collar void 500 of the inner layer 116, and the inner layer 116 can be attached to the collar 112 via a weld or other attachment or connection mechanism. In other embodiments, the inner layer 116 can be configured to surround the support surface 122 of the collar 112, and the inner layer 116 can be welded or otherwise attached or connected to the collar 112. As such, operation 602 can include welding the inner layer 116 to the collar 112 and/or welding the collar 112 to the inner layer 116. Because welding is one contemplated securing mechanism used to secure the collar 112 to the inner layer 116, it should be understood that this embodiment is illustrative, and should not be construed as being limiting in any way.

From operation 602, the method 600 proceeds to operation 604, wherein the outer layer 114 of the duct 104 can be located on top of the collar 112. More particularly, as illustrated and described above with reference to FIGS. 1-3, the outer layer 114 can be dimensioned to surround the collar 112. As such, operation 604 can include moving the outer layer 114 into a position at which the outer layer 114 surrounds the collar 112. In some embodiments, the outer layer 114 is located such that an edge of the outer layer 114 is located at a midpoint of the collar 112, thought this is not necessarily the case.

From operation 604, the method 600 proceeds to operation 606, wherein the outer layer 114 can be welded or otherwise secured to the collar 112. It can be appreciated from the description of FIGS. 1-5C that by securing the outer layer 114 to the collar 112, the fluid passageway 118 can be formed between the inner layer 116 and the outer layer 114, though this is not necessarily the case. Furthermore, because various attachment or connection mechanisms can be used to secure the outer layer 114 to the collar 112, the embodiment described above, wherein welding is used, should be understood as being illustrative and should not be construed as being limiting in any way.

From operation 606, the method 600 proceeds to operation 608, wherein the clamp 110 is located over the collar 112 and the duct 104. In some embodiments, the clamp 110 is dimensioned to contact the outer layer 114. More particularly, an inner diameter of the clamp 110 can be substantially equal, or only slightly greater than, an outside diameter of the outer layer 114, if desired. Because this is not necessarily the case, and because the clamp 110 can be configured with an adjustable inside diameter, it should be understood that this embodiment is illustrative, and should not be construed as being limiting in any way.

From operation 608, the method 600 proceeds to operation 610, wherein the clamp 110 is secured to the outer layer 114. In some embodiments, the clamp 110 is welded to the outer layer 114, though this is not necessarily the case. The attachment mechanisms 108 of the clamp 110 can be used to connect or attach the duct fitting 102 and/or the duct 104 to a desired support structure 106, though this is not necessarily the case. From operation 610, the method 600 proceeds to operation 612. The method 600 ends at operation 612.

Figure 7:
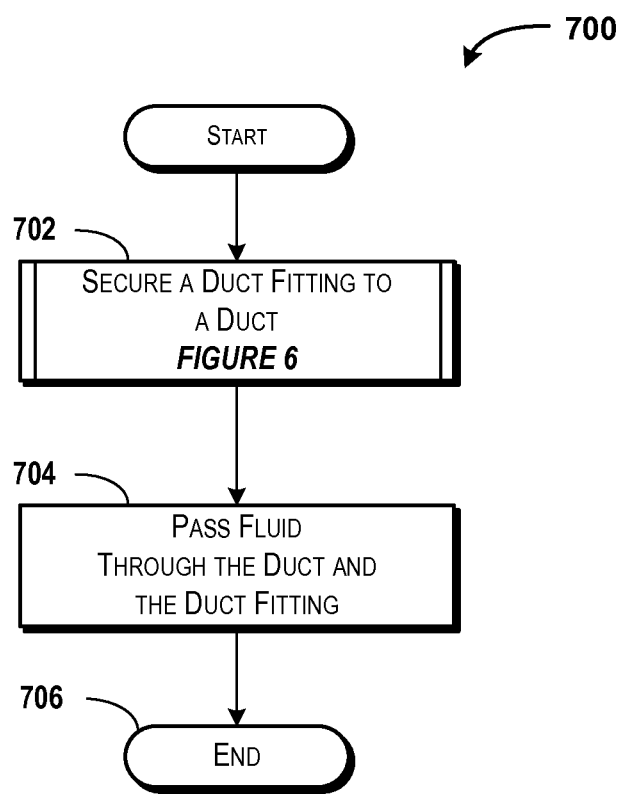
FIG. 7 is a flow diagram showing aspects of a method for using a duct fitting, according to an illustrative embodiment.

Turning now to FIG. 7, aspects of a method 700 for using a duct fitting 102 will be described in detail, according to an illustrative embodiment. The method 700 begins at operation 702, wherein the duct fitting 102 is secured to a multilayered duct such as the duct 104 illustrated and described above with reference to FIGS. 1-2. It should be understood that in some embodiments, the functionality of operation 702 can, but does not necessarily, include the functionality described above with reference to FIG. 6. It should be understood that this embodiment is illustrative, and should not be construed as being limiting in any way.

From operation 702, the method 700 proceeds to operation 704, wherein one or more fluids are passed through the duct 104 and the duct fitting 102. It can be appreciated from the description above that passing the fluids through the duct 104 can include passing the fluids between one or more layers of the duct 104 and/or passing the fluids through one or more fluid flow paths or passageways ("passageways") associated with the duct 104. Thus, for example, passing the fluids through the duct 104 can include passing the fluids through the fluid passageway 118 and/or the inner fluid passageway 120. It should be understood that this embodiment is illustrative, and should not be construed as being limiting in any way.

Similarly, passing the fluids through the duct fitting 102 can include passing the fluids through one or more structures of the duct fitting 102. For example, the fluids can be passed through the voids 300 of the collar 112, though this is not necessarily the case. Similarly, passing the fluids through the duct fitting 102 can include passing the fluids through the inner collar void 500 of the collar 112. It should be understood that these embodiments are illustrative, and should not be construed as being limiting in any way. It some embodiments, a method for using the duct fitting 102 includes only operation 704, and operation 702 can be omitted. From operation 704, the method 700 proceeds to operation 706. The method 700 ends at operation 706.

Based on the foregoing, it should be appreciated that concepts and technologies for duct fittings are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A duct fitting comprising:
    a collar comprising a first annular portion comprising a support surface for engaging a first layer of a multi-layered duct and a second annular portion comprising a plurality of splines having voids formed therebetween, wherein the splines are configured to support a second layer of the multilayered duct; and
    a clamp disposed around the collar and independent from the collar, the clamp comprising an attachment mechanism configured to connect the clamp to a support structure, wherein the clamp is configured to cooperate with the collar to secure the second layer of the multilayered duct between the clamp and the collar such that opposing sides of the second layer abut the clamp and the splines of the collar.

2. The duct fitting of claim 1, wherein the splines comprise a plurality of circumferentially spaced-apart teeth formed in the collar.

3. The duct fitting of claim 1, wherein the voids are configured to provide fluid flow paths for fluids to pass through the duct fitting.

4. The duct fitting of claim 3, wherein the fluids comprise a fluid located within a fluid passageway formed between the first layer and the second layer.

5. The duct fitting of claim 1, wherein the attachment mechanism comprises a devise attached to the clamp.

6. The duct fitting of claim 1, wherein the support structure comprises a portion of an aircraft.

7. The duct fitting of claim 6, wherein the duct comprises a fuel line of the aircraft.

8. The duct fitting of claim 1, wherein the support surface is configured to engage an outer surface of the first layer of the multilayered duct.

9. The duct fitting of claim 1, wherein the support surface is configured to engage an inner surface of the first layer of the multilayered duct.

10. The duct fitting of claim 1, wherein the clamp is configured to engage an outer surface of the second layer of the multilayered duct.

* * * * *